United States Patent
Yang

(10) Patent No.: US 7,657,619 B1
(45) Date of Patent: Feb. 2, 2010

(54) METHOD AND SYSTEM FOR MAINTAINING A LOOP-FREE TOPOLOGY ACROSS MULTIPLE SPANNING TREES IN A VIRTUAL LOCAL AREA NETWORK

(75) Inventor: Xuguang Yang, Sunnyvale, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 121 days.

(21) Appl. No.: 11/402,151

(22) Filed: Apr. 10, 2006

Related U.S. Application Data

(62) Division of application No. 10/000,697, filed on Nov. 13, 2001, now abandoned.

(51) Int. Cl.
*G06F 15/173* (2006.01)
(52) U.S. Cl. .................... 709/223; 709/239; 370/256
(58) Field of Classification Search ................ 709/239, 709/223; 370/254–256
See application file for complete search history.

(56) References Cited

U.S. PATENT DOCUMENTS

| | | | |
|---|---|---|---|
| 5,920,699 A | 7/1999 | Bare | |
| 6,128,665 A * | 10/2000 | Iturralde | 709/238 |
| 6,556,541 B1 * | 4/2003 | Bare | 370/235 |
| 6,577,600 B1 | 6/2003 | Bare | |
| 6,611,872 B1 | 8/2003 | McCanne | |
| 6,628,624 B1 * | 9/2003 | Mahajan et al. | 370/256 |
| 6,678,241 B1 | 1/2004 | Gai et al. | |
| 6,697,338 B1 * | 2/2004 | Breitbart et al. | 370/254 |
| 6,765,881 B1 | 7/2004 | Rajakarunanayake | |
| 6,801,506 B1 * | 10/2004 | Dey | 370/256 |
| 6,813,250 B1 * | 11/2004 | Fine et al. | 370/256 |
| 6,839,348 B2 * | 1/2005 | Tang et al. | 370/390 |
| 6,847,620 B1 * | 1/2005 | Meier | 370/328 |
| 6,865,160 B1 | 3/2005 | Bare | |
| 6,898,189 B1 * | 5/2005 | Di Benedetto et al. | 370/256 |
| 6,940,825 B2 * | 9/2005 | Goldman et al. | 370/256 |
| 6,963,575 B1 * | 11/2005 | Sistanizadeh et al. | 370/404 |
| 2002/0147800 A1 * | 10/2002 | Gai et al. | 709/221 |
| 2003/0016624 A1 * | 1/2003 | Bare | 370/217 |
| 2003/0043843 A1 * | 3/2003 | Smith et al. | 370/462 |
| 2003/0046390 A1 * | 3/2003 | Ball et al. | 709/224 |
| 2004/0076160 A1 | 4/2004 | Phaltankar | |
| 2004/0221087 A1 * | 11/2004 | Benedetto et al. | 710/316 |
| 2005/0259597 A1 * | 11/2005 | Benedetto et al. | 370/254 |

OTHER PUBLICATIONS

Norman Finn; Multiple Spanning Trees in 802.1Q, Sep. 26, 1996.
Suba Varadarajan; Virtual Local Area Network, modified Aug. 14, 1997.

* cited by examiner

*Primary Examiner*—Salad Abdullahi
(74) *Attorney, Agent, or Firm*—Blakely, Sokoloff, Taylor & Zafman, LLP

(57) ABSTRACT

A network includes a virtual local area network (VLAN) and multiple spanning tree protocol domains (STPDs). Switches in the network receive messages from other switches and select one path for continued transmission of data based on the content of the messages. The content of each message identifies the path through which the message was transmitted. After one path is selected, all other paths are blocked. Once paths are blocked, no messages are transmitted through those paths to the switch. This eliminates redundant paths and provides a loop-free inter-domain topology throughout the network.

22 Claims, 3 Drawing Sheets

METHOD AND SYSTEM FOR MAINTAINING A LOOP-FREE TOPOLOGY ACROSS MULTIPLE SPANNING TREES IN A VIRTUAL LOCAL AREA NETWORK

RELATED APPLICATIONS

The present patent application is a Divisional of application Ser. No. 10/000,697, filed Nov. 13, 2001 now abandoned, entitled "Method and System for Maintaining a Loop Free Topology across Multiple Spanning Trees in a Virtual Local Area Network".

BACKGROUND OF THE INVENTION

1. Field of the Invention

The invention relates to the field of virtual local area networks (VLANs). In particular, the invention relates to inter-domain loop protection for VLANs with multiple spanning tree protocol domains.

2. Background Information and Description of Related Art

A virtual local area network (VLAN) restricts communication between computers in a local area network (LAN) on some other basis than physical location of the computers. The computers in the VLAN communicate with each other as if they are connected to the same LAN segment even though they may actually be physically located on different segments of a LAN.

LANs are often partitioned into separate segments to increase network performance. Bridges or switches connect the segments. A LAN may include redundant bridges and paths to provide backup in the event of a bridge or path failure in the LAN. The Spanning Tree Protocol (STP), part of the IEEE 802.1D standard, comprises an algorithm that provides for this redundancy while preventing undesirable loops in the LAN. Using the algorithm, bridges select a root bridge, and calculate and select a single path to the root bridge when faced with multiple redundant paths. After path costs are calculated and a single path is selected, the bridges block the redundant links.

The STP algorithm defined in IEEE 802.1D has been modified in different ways to further accommodate VLANs. For example, the IEEE 802.1Q standard specifies a single STP instance for all VLANs while another approach provides for a separate STP instance for each VLAN. Yet another approach contemplates one or more STP instances for one or more VLANs. Thus, an STP instance or STP domain (STPD) may span multiple VLANs, or a single VLAN may encompass multiple STPDs. However, one problem with multiple STPDs is the possibility of inter-domain loops through the switches that are members of more than one STPD, since the STP algorithm only guarantees a loop-free topology inside each domain.

SUMMARY

According to one aspect of the invention, a method is provided to receive messages from switches and select only one path for continued transmission of data based on the content of the messages.

According to one aspect of the invention, an article of manufacture is provided to carry out the above and other methods.

According to one aspect of the invention, a computer network with at least one virtual local area network and multiple spanning tree protocol domains is provided to carry out the above and other methods. The computer network has a plurality of originator switches to transmit messages, and a plurality of receiver switches to receive messages. Each message contains content that identifies a path via which the message was transmitted. Each receiver switch selects one of the paths for continued transmission of data based on the content of the messages and blocks all other paths.

BRIEF DESCRIPTION OF DRAWINGS

The invention is illustrated by way of example, and not by way of limitation, in the figures of the accompanying drawings in which like reference numerals refer to similar elements.

DETAILED DESCRIPTION OF THE INVENTION

Embodiments of a method and system for maintaining a loop-free topology across multiple spanning trees in a virtual local area network are described in detail herein. In the following description, numerous specific details are provided for a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
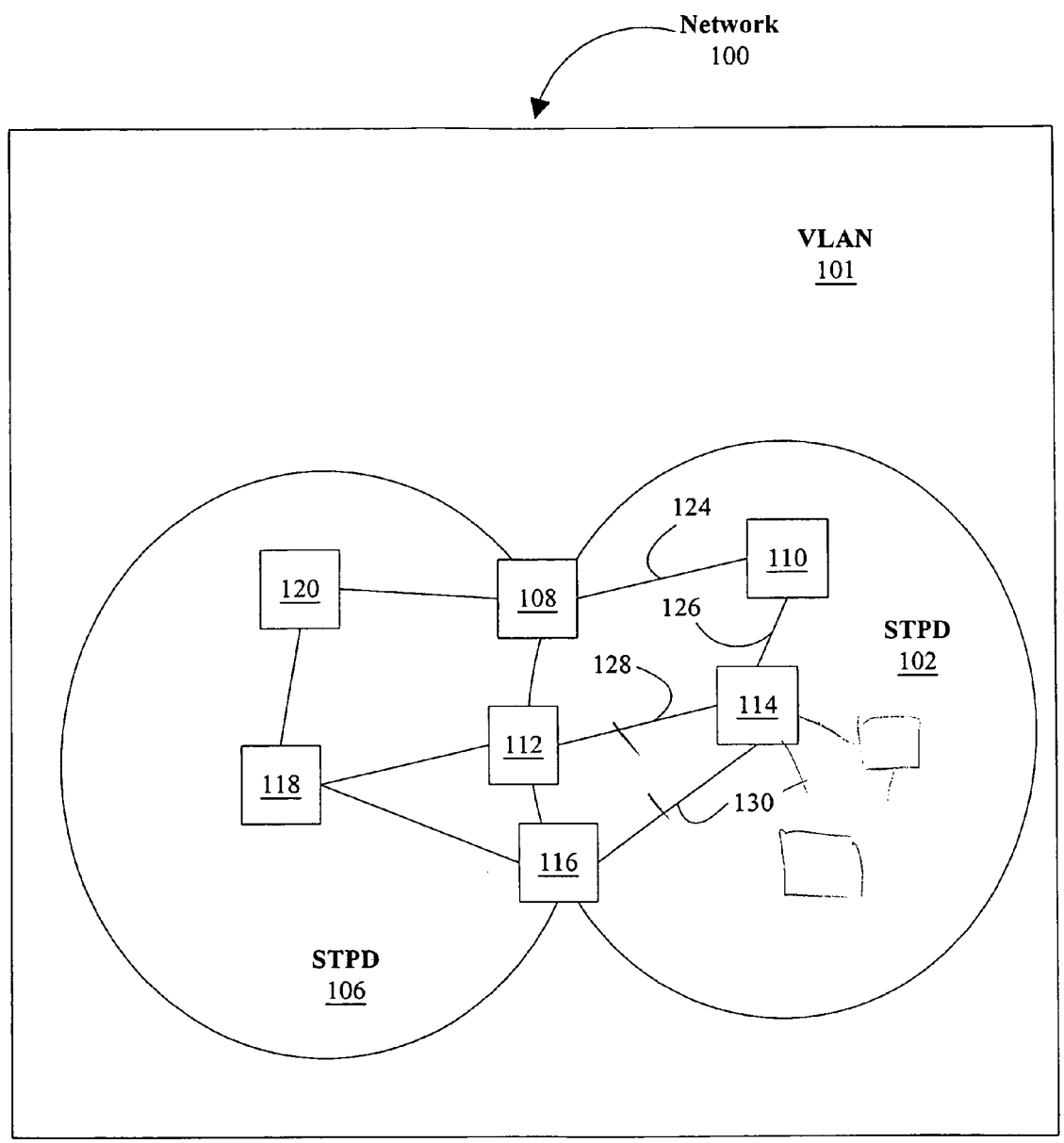
FIG. 1 illustrates one embodiment of a network implementing the invention.

Referring to FIG. 1, one embodiment of a network 100 implementing the invention is illustrated. Those of ordinary skill in the art will appreciate that the network 100 may include more components than those shown in FIG. 1. However, it is not necessary that all of these generally conventional components be shown in order to disclose an illustrative embodiment for practicing the invention. The network 100 may contain one or more Virtual Local Area Networks (VLANs). Each VLAN may contain one or more Spanning Tree Protocol Domains (STPDs). These STPDs may or may not overlap. One STPD may span multiple VLANs. For purposes of illustration, an example implementation will be discussed in which the network 100 contains a single VLAN 101. However, those of ordinary skill in the art will appreciate that the network 100 may contain multiple VLANs that are under partition by one or more STPDs. As an example, two STPDs, 102 and 106 are operating in VLAN 101. Each STPD contains one or more switches. For example, STPD 102 contains switches 108, 110, 112, 114, and 116. STPD 106 contains switches 108, 112, 116, 118, and 120. STPD 102 and STPD 106 overlap at switches 108, 112, and 116.

The Spanning Tree Protocol (STP) algorithm, part of the IEEE 802.1D standard, produces a loop-free topology inside each STPD. However, there is still the possibility of inter-domain loops through the switches that are members of more than one STPD. For example, each of the STPDs 102 and 106 are loop-free within their domain due to the STP algorithm. However, there are still inter-domain loops present in the network. For example, there is an inter-domain loop through switches 112, 114, 116, and 118. There is also an inter-domain loop through switches 108, 110, 114, 116, 118, and 120. The invention provides a method that produces a loop-free inter-domain topology in the network.

Figure 2:
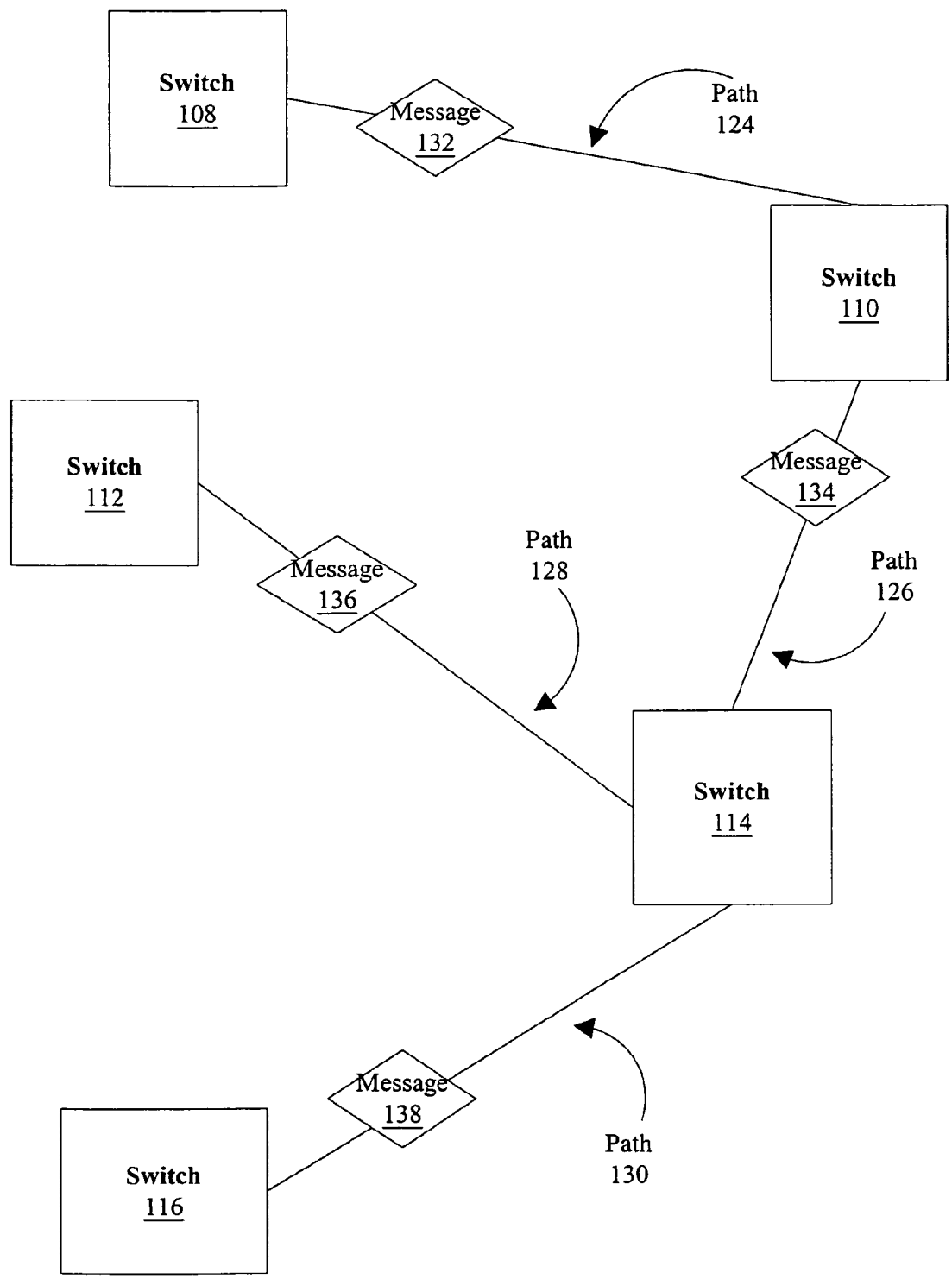
FIG. 2 illustrates one embodiment of switches implementing the invention.

Referring to FIG. 2, one embodiment of the invention is illustrated. Switches 108, 112, and 116 are inter-domain switches and, thus, each belongs to more than one STPD. Switches 108, 112, and 116 each belong to STPD 102 and STPD 106.

Each switch communicates with other switches by sending messages via the paths that connect them. For example, switch 108 sends message 132 via path 124 to switch 110. Each message contains information that helps to keep track of and disable redundant inter-domain paths.

According to the STP algorithm, switches select a root switch, and calculate and select a single path to the root bridge when faced with multiple redundant paths. The switches block the redundant links to produce a loop-free topology within the domain. For example, the root switch in STPD 102 is switch 114, and the root switch in STPD 106 is switch 118. In one embodiment, the inter-domain switches send messages toward the root switch in one of the STPDs in which they are members. Only one STPD is selected, since blocking paths in one STPD is sufficient to produce a loop-free inter-domain topology. In one embodiment, each STPD has an identification number and the switch selects one STPD based on the STPD identification numbers. For example, the switch may select the STPD with the smaller identification number.

For simplicity in illustrating an example embodiment, suppose that the STPD identification number of each STPD is the same as the STPD reference number in FIG. 1. Switch 112 is an inter-domain switch that belongs to STPD 102 and STPD 106. Assuming switch 112 selects the STPD with the smaller identification number, switch 112 selects STPD 102 and sends message 136 to root switch 114 via path 128. Similarly, inter-domain switch 116 selects STPD 102 over STPD 106 and sends message 138 to root switch 114 via path 130. Inter-domain switch 108 selects STPD 102 over STPD 106 and sends message 132 toward root switch 114. Since there is no direct path from switch 108 to root switch 114, switch 108 sends message 132 to switch 110 via path 124. Switch 110 relays message 132 to root switch 114.

For the sake of discussion, when a switch sends a message, it is referred to herein as an originator switch of that message. When a switch receives a message, it is referred to as a receiver switch for that message. For example, if switch 108 sends message 132 to switch 110, switch 108 is the originator switch and switch 110 is the receiver switch. If switch 110 sends message 134 to switch 114, switch 110 is the originator switch and switch 114 is the receiver switch.

Figure 3:
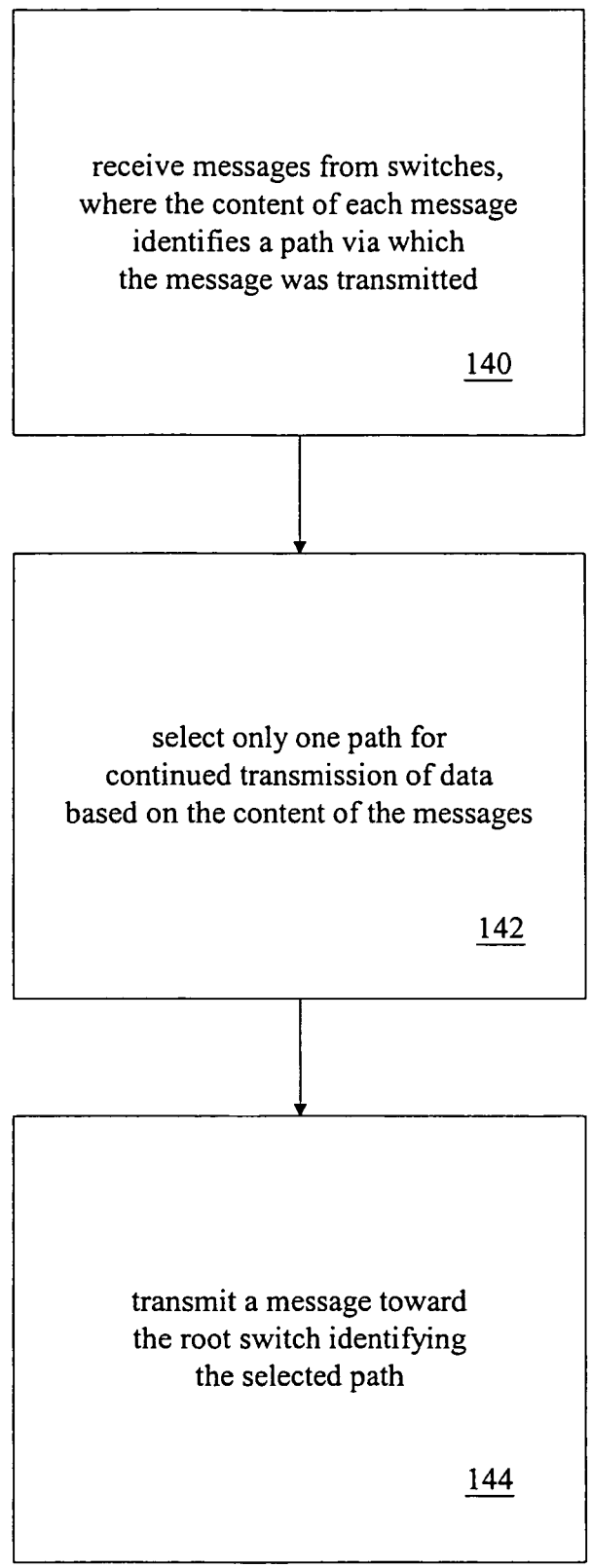
FIG. 3 is a flow chart that illustrates an embodiment of the invention.

Referring to FIG. 3, a flow chart that illustrates an embodiment of a method of the invention is shown. The method begins at step 140, when a switch receives messages from other switches. Each message contains content that identifies the path via which the message was transmitted. In one embodiment, a message may include a bridge identification number that identifies the switch that sent the message. The message may include STPD identification numbers that identify the STPDs to which an inter-domain switch belongs. The message may include a VLAN identification number that identifies the VLAN to which the switch belongs. In one embodiment, a message is encoded with a special address, for example, a proprietary multicast MAC address, so that switches that have not been configured to use the method of the invention and do not recognize the message will simply flood or transmit the message to other switches in the network.

In one embodiment, when a switch receives a message, the switch records the content of the message. A switch may associate the path via which the message was transmitted with the port through which the message was received. A switch may also record the port number of the port through which the message was received. In one embodiment, if the switch receiving messages is also an inter-domain switch, the switch records its own switch identification number along with other identification numbers that identify the existence of paths in other STPDs via which the switch can send data. In this case, the inter-domain switch may associate its own switch identification number with a special receiving port number of NULL.

In one embodiment, a switch receiving multiple messages from different originator switches via the same incoming port selects one of the messages and records the information from the selected message only. Selecting one message may be based on the bridge identification numbers. For example, a switch may choose to record only the information from the message that was sent from the switch with the smallest bridge identification number.

After receiving the messages, the method continues to step 142, where the switch selects only one path for continued transmission of data. In one embodiment, to select one path, the switch generates a list of paths and searches the list for one path that meets a predetermined criteria. For example, the switch may select the path associated with the message sent from the switch with the smallest identification number. In one embodiment, the list may be sorted. If the switch is an inter-domain switch, it may select the path associated with its own identification number and keep this path at the head of the list.

In one embodiment, after selecting one of the paths, all other paths are blocked. The switches block the ports associated with the other paths. No data will be able to be transmitted to the switch through the blocked paths. This eliminates the redundant inter-domain paths in the network and provides a loop-free topology.

In one embodiment, after selecting only one path, the method continues to step 144, where the switch transmits a message toward a root switch identifying the selected path. The message transmitted may also contain identification numbers that identify the path through which the message was transmitted. In one embodiment, the message transmitted may contain a bridge ID that identifies the switch that sent the message, a STPD ID that identifies the STPDs to which the switch belongs, or a VLAN ID that identifies the VLAN to which the switch belongs. Messages may be propagated through the network until all redundant paths are blocked.

An illustrative example of the method will now be described. Referring to FIG. 1, there are two inter-domain loops that need to be corrected: one loop through switches 112, 114, 116, and 118 and the other loop through switches 108, 110, 114, 116, 118, and 120. In order to produce a loop-free inter-domain topology, it is sufficient to block paths in one STPD. Therefore, the inter-domain switches will select one STPD to which to send messages. These messages will help the switches keep track of and disable the redundant paths. For example, the inter-domain switches may select the STPD with the smallest identification number, such as would be STPD 102. If switch 114 is the root switch of STPD 102, switches 108, 110, 112, and 116 send messages toward switch 114. Switch 114 receives message 134 via path 126, message 136 via path 128, and message 138 via path 130. Switch 114 records the content of the messages, including any identification numbers. Switch 114 may also record the port numbers of the ports through which the messages were transmitted. Switch 114 then selects one of the paths. For example, switch 114 may select the path associated with the message that was sent from the switch with the smallest bridge identification number. Since the message with the smallest bridge identification number was received from switch 110, path 126 is selected. Then, all other paths are blocked, for example, path 128 and path 130 are blocked. The paths are blocked by blocking the ports associated with the paths. After the paths are blocked, no messages are transmitted through the blocked paths. Therefore, no messages are transmitted from switch 112 or switch 116 to switch 114 via path 128 or path 130. However, messages are still transmitted from switch 110 to switch 114 via path 126, since this path was not blocked. Data can still be transmitted from each switch to every other switch in the network. For example, data can be transmitted from switch 112 to switch 114 via the paths through switches 118, 120, 108, and 110.

By blocking two paths in the network 100 through the method described above, the redundant inter-domain paths in network 100 have been eliminated. As a result, network 100 has an inter-domain loop-free topology.

As will be appreciated by those skilled in the art, the content for implementing an embodiment of the method of the invention, for example, computer program instructions, may be provided by any machine-accessible media which can store data that is accessible by a switch in network 100, as part of or in addition to memory, including but not limited to cartridges, magnetic cassettes, flash memory cards, digital video disks, RAMs, read-only memories (ROMs), and the like. In this regard, the switches are equipped to communicate with such machine-accessible media in a manner well-known in the art.

It will be further appreciated by those skilled in the art that the content for implementing an embodiment of the method of the invention may be provided to a switch in network 100 from any external device capable of storing the content and communicating the content to the switch. For example, in one embodiment, network 100 may be connected to another network, and the content may be stored on any device in the other network.

Thus, a method and system for maintaining a loop-free topology across multiple spanning trees in a virtual local area network has been described. The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. In a network having multiple spanning tree domains and multiple inter-domain network paths, a method comprising:
    sending messages, via an inter-domain switch, on respective network paths from switches that are each members of a first spanning tree domain and a second spanning tree domain toward a root switch of the first spanning tree domain, wherein the switches belong to the same virtual local area network (VLAN);
    preventing the sending of messages from the switches that are each members of the first spanning tree domain and the second spanning tree domain toward a root switch of the second spanning tree domain;
    receiving the messages at ports of a switch on the first spanning tree domain; and
    blocking one or more of the ports when multiple received messages originate from different switches, wherein blocking the one or more of the ports comprises: generating a list of network paths to the switch from the received messages, selecting from the list, a network path that meets a predetermined criteria, and blocking one or more ports that do not correspond to the selected network path.

2. The method of claim 1, wherein each message comprises content to identify a network path via which the message was received.

3. The method of claim 2, wherein the content of each message further comprises a bridge identification number that identifies a switch that sent the message.

4. The method of claim 3, wherein the predetermined criteria is based at least in part on bridge identification numbers.

5. The method of claim 3, wherein the list of network paths is sorted based at least in part on bridge identification numbers and selecting a network path from the list further comprises selecting a path at the head of the list.

6. The method of claim 1, further comprising associating a network path via which each message was received with a port at which the message was received.

7. The method of claim 6, further comprising:
    determining if more than one message has been received through a single port;
    selecting one message for the port; and
    recording only contents of the selected message.

8. The method of claim 7, further comprising:
    transmitting a message from the switch toward a root switch, the message identifying a selected network path.

9. An article of manufacture comprising a machine accessible medium having content stored thereon to provide instructions that cause a machine to perform operations including:
    sending messages on respective network paths from switches that are each members of a first spanning tree domain and a second spanning tree domain toward a root switch of the first spanning tree domain, wherein the switches belong to the same virtual area network (VLAN);
    preventing the sending of messages from the switches that are each members of the first spanning tree domain and the second spanning tree domain toward a root switch of the second spanning tree domain;
    receiving the messages at ports of a switch on the first spanning tree domain; and
    blocking one or more of the ports when multiple received messages originate from different switches by generating a list of network paths to the switch based on the received messages, selecting a network path that meets a predetermined criteria from the list generated, and blocking the one or more ports that do not correspond to the network path selected.

10. The article of manufacture of claim 9, wherein each message comprises content to identify a network path via which the message was received.

11. The article of manufacture of claim 10, wherein the content of each message further comprises a bridge identification number that identifies a switch that sent the message.

12. The article of manufacture of claim 11, wherein the predetermined criteria is based at least in part on bridge identification numbers.

13. The article of manufacture of claim 11, wherein the list of network paths is sorted based at least in part on bridge identification numbers and selecting a network path from the list comprises further instructions including selecting a path at the head of the list.

14. The article of manufacture of claim 9, comprising further instructions including associating a network path via which each message was received with a port at which the message was received.

15. The article of manufacture of claim 14, comprising further instructions including:
 determining if more than one message has been received through a single port;
 selecting one message for the port; and
 recording only contents of the selected message.

16. In a network having multiple scanning tree domains and multiple inter-domain network paths, a method comprising:
 sending messages, via an inter-domain switch, on respective network paths from switches that are each members of a first spanning tree domain and a second spanning tree domain toward a root switch of the first spanning tree domain, wherein the switches belong to the same virtual local area network (VLAN);
 preventing, via the inter-domain switch, the sending of messages from the switches that are each members of the first spanning tree domain and the second spanning tree domain toward a root switch of the second spanning tree domain;
 receiving the messages sent from the switches that are members of the multiple spanning tree domains at ports of the root switch and wherein the root switch abstains from sending the messages toward a root switch of any other spanning tree domain; and
 blocking one or more of the ports of the root switch when multiple received messages originate from different switches by generating a list of network paths to the switch based on the received messages, selecting a network path that meets a predetermined criteria from the list generated, and blocking the one or more ports that do not correspond to the network path selected.

17. The method of claim 16, wherein each message comprises content to identify a network path via which the message was received.

18. The method of claim 17, wherein the content of each message further comprises a bridge identification number that identifies a switch that sent the message.

19. The method of claim 18, wherein the predetermined criteria is based at least in part on bridge identification numbers.

20. The method of claim 18, wherein the list of network paths is sorted based at least in part on bridge identification numbers and selecting a network path from the list comprises further instructions including selecting a path at the head of the list.

21. The method of claim 16, comprising further instructions including associating a network path via which each message was received with a port of the root switch at which the message was received.

22. The method of claim 21, comprising further instructions including:
 determining if more than one message has been received through a single port;
 selecting one message for the port; and
 recording only contents of the selected message.

* * * * *